(12) United States Patent
Schwalm

(10) Patent No.: US 7,273,507 B2
(45) Date of Patent: *Sep. 25, 2007

(54) ON-BOARD INERT GAS GENERATION SYSTEM

(75) Inventor: Gregory K. Schwalm, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 356 days.

This patent is subject to a terminal disclaimer.

(21) Appl. No.: 11/006,966

(22) Filed: Dec. 8, 2004

(65) Prior Publication Data

US 2006/0117956 A1    Jun. 8, 2006

(51) Int. Cl.
*B64D 37/32* (2006.01)
*B01D 53/22* (2006.01)

(52) U.S. Cl. .............................. 55/467; 96/4
(58) Field of Classification Search .............. 95/19, 95/22, 54; 96/4; 55/467; 244/135 R
See application file for complete search history.

(56) References Cited

U.S. PATENT DOCUMENTS

| | | | | |
|---|---|---|---|---|
| 5,069,692 | A | * | 12/1991 | Grennan et al. ............ 96/4 |
| 6,729,359 | B2 | | 5/2004 | Jones |
| 6,739,359 | B2 | | 5/2004 | Jones et al. |
| 6,913,636 | B2 | * | 7/2005 | Defrancesco et al. .......... 95/8 |
| 2003/0005718 | A1 | | 1/2003 | Mitani et al. |
| 2003/0005719 | A1 | | 1/2003 | Mitani et al. |
| 2005/0151019 | A1 | * | 7/2005 | Stevens ................. 244/135 R |
| 2005/0279208 | A1 | * | 12/2005 | Schwalm ..................... 96/4 |
| 2006/0185514 | A1 | * | 8/2006 | Schwalm et al. ............ 96/4 |

OTHER PUBLICATIONS

U.S. Patent Application: On-Board Inert Gas Generation System With Compressor Surge Protection, filed on Feb. 24, 2005.
European Communication and Search Report, Feb. 21, 2006.

* cited by examiner

*Primary Examiner*—Frank M. Lawrence
(74) *Attorney, Agent, or Firm*—Carlson, Gaskey & Olds

(57) ABSTRACT

An on-board inert gas generation system provides first and second compressors in fluid communication with one another. The second compressor includes an inlet and an outlet. The inlet is in fluid communication with the first compressor. The second compressor is the final compressor stage of the system. An air separation module is fluidly connected to the outlet of the second compressor by a passageway. A vent passage is arranged between the outlet and the air separation module for venting fluid between the outlet and air separation module. The vent passage enables the flow from the second compressor to be increased thereby increasing compressor efficiency and increasing the inlet pressure to the air separation module, which enables use of a smaller air separation module.

7 Claims, 1 Drawing Sheet

ON-BOARD INERT GAS GENERATION SYSTEM

BACKGROUND OF THE INVENTION

This invention relates to an on-board inert gas generation system. Specifically, the invention relates to a method and apparatus for increasing the pressurized air provided to an air separation module of the system.

On-board inert gas generation systems are increasingly used in aircraft to provide inert gas to various locations such as the cargo area or fuel tanks. Typically, the system includes two compressors or stages arranged in series for providing compressed air to the air separation module. It is desirable to provide high pressures to the air separation module to reduce the weight of the module. Lowering the inlet pressure to the module greatly increases its weight.

Centrifugal compressors are typically used in the system to provide compressed air to the module. One proposed system employs an electric motor to drive the compressors. The electric motor does not utilize all the available electric power to drive the compressor because of compressor rotor blade design limitations. Although more electrical power is available, it is not used to drive the compressor at higher speed to increase pressure to the module. Specifically, in order to increase the compressor pressure ratio and provide increased pressure to the module inlet for a given flow rate and fixed motor speed, the rotor blade height must be decreased. Because the gap height between the blade and compressor housing is essentially fixed, decreasing the rotor blade height decreases the ratio of rotor blade height to gap height, which causes the efficiency of the compressor to drop to an unknown and unpredictable level, thereby compromising the integrity of the system.

It is desirable in the industry to utilize rotor blade designs that have been proven in previous commercial applications. This lowers the risk to the customer and increases confidence that the compressor will perform as predicted while reducing system lead times and development costs.

What is needed is an on-board inert gas generation system that utilizes proven centrifugal pump rotor designs while providing increased inlet pressure to the air separation module.

SUMMARY OF THE INVENTION

An on-board inert gas generation system of the present invention provides first and second compressors in fluid communication with one another. The second compressor includes an inlet and an outlet. The inlet is in fluid communication with the first compressor so that the compressors are in series. The second compressor is the final compressor stage of the system, in one example.

An air separation module is fluidly connected to the outlet of the second compressor by a passageway. A vent passage is arranged between the outlet and the air separation module for venting fluid between the outlet and inert separation module. The vent passage enables the flow from the second compressor to be increased at the higher speed thereby increasing the inlet pressure to the air separation module, which enables use of a smaller air separation module.

The vent passage vents the compressed fluid to the atmosphere through the ram air outlet duct, which results in an increase air flow through the ram air ducts resulting in an increase in efficiency of the system's heat exchangers.

Accordingly, the present invention provides an on-board inert gas generation system that utilizes proven centrifugal compressor rotor designs while providing increased inlet pressure to the air separation module.

These and other features of the present invention can be best understood from the following specification and drawings, the following of which is a brief description.

DETAILED DESCRIPTION OF THE PREFERRED EMBODIMENT

Figure 1:
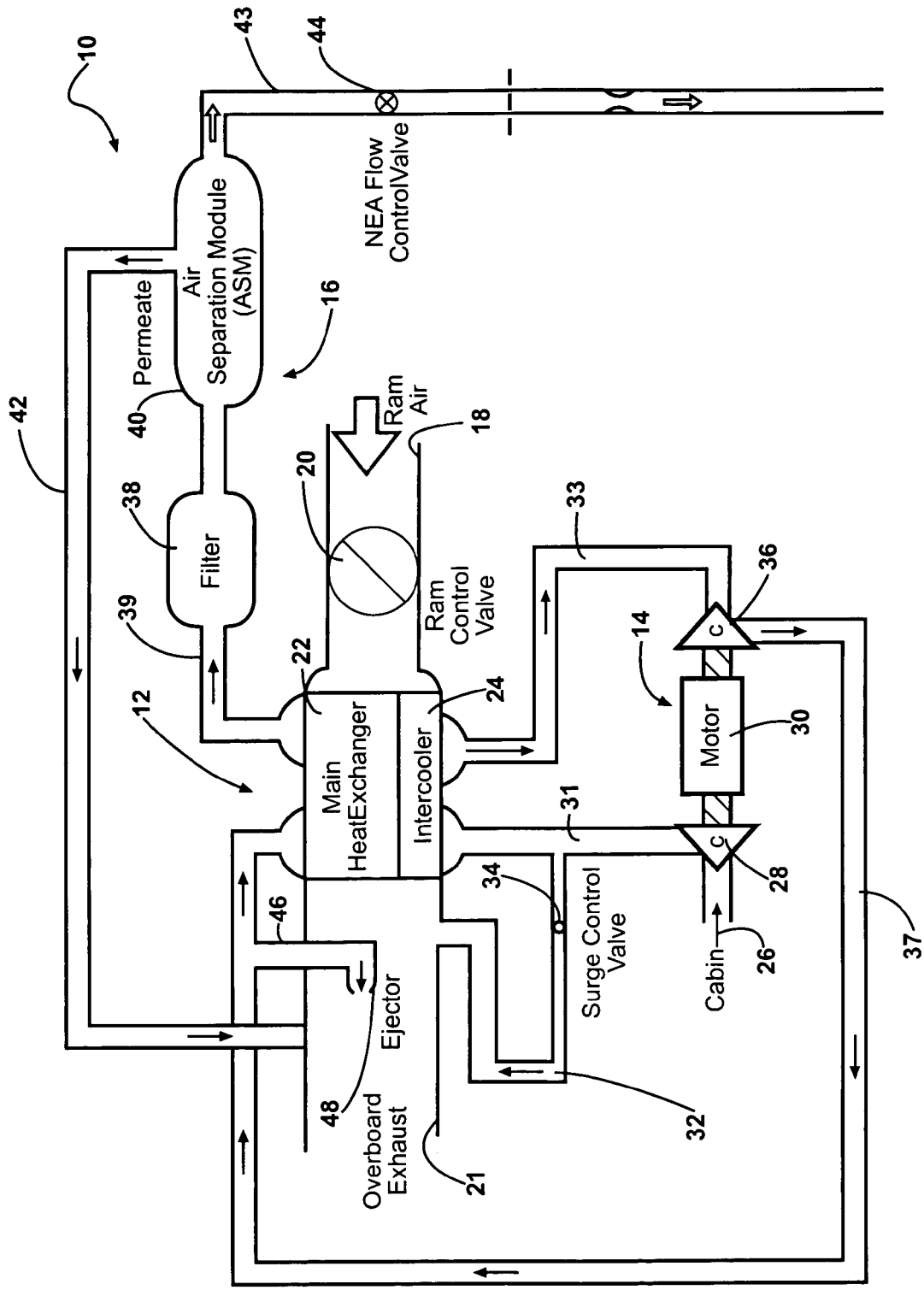
FIG. 1 is a schematic illustration of one example of the inventive on-board inert gas generation system.

FIG. 1 is a highly schematic depiction of one example of an inventive on-board inert gas generation system 10. The system 10 includes a heat exchanger system 12 that removes heat generated by compressed air from a compressor system 14. The compressed air provides pressurized air to an air separation module system 16.

The heat exchanger system 12 is arranged between a ram air inlet duct 18 and a ram air outlet duct 21. Flow through the ram air ducts 18 and 21 is regulated by a control valve 20 arranged between the ram air inlet duct 18 and the heat exchanger system 12.

Air 26 enters the system 10, for example from the cabin, into a first compressor 28 of the compressor system 14. The first compressor 28 is driven by an electric motor 30. The compressed air exits the first compressor 28 and flows through a passageway 31 through an intercooler 24 of the heat exchanger system 12 where the ram air removes the heat from the compressed air.

A surge control passage 32 is arranged between the passageway 31 and the ram air outlet duct 21. A surge control valve 34 is arranged within the surge control passage 32. The surge control valve 34 selectively regulates flow through the surge control passage 32 in response to transient conditions of the first compressor 28. Specifically, when flow through the first compressor 28 is reduced below the design flow, a surge may result that can damage or destroy the first compressor. The valve 34 opens to release flow to the ram air outlet duct 21 and stabilize the first compressor 28 when flow to the air separation module 40 is reduced via valve 44.

Cooled air from the intercooler 24 flows through the passageway 33 to an inlet of a second compressor 36. The second compressor 36 is also driven by the electric motor 30. Compressed air exits an outlet of the second compressor 36 and flows through a passageway 37 to a main heat exchanger 22 of the heat exchanger system 12. Air flowing through the main heat exchanger 22 is cooled by the ram air before flowing to a passageway 39. A filter 38 is arranged within the passageway 39. The filtered air enters an air separation module 40 of the air separation system 16 at an inlet. The air separation module 40 produces inert gas such as nitrogen for aircraft locations such as the fuel tank and cargo area. Permeate produced by the air separation module 40 flows through a permeate passage 42 to the ram air outlet duct 21. The inert gas flows through passageway 43 through a nitrogen enriched airflow valve 44.

It is desirable to provide high pressure to the inlet of the air separation module 40 so that the weight and size of the module 40 may be minimized to the greatest extent possible. However, since it is desirable to utilize proven centrifugal rotor blade designs for the second compressor 36, prior art configurations of on-board inert gas generation systems are unable to increase the pressure at the inlet of the module 40 to the degree desired.

In one example of the present invention, a vent passage 46 is arranged between outlet of the second compressor 36 and the air separation module. Specifically, the vent passage 46 is in fluid communication with the passageway 37. The compressed fluid from the second compressor 36 is vented to the ram air outlet duct 21. In the example shown, the vent passage 46 vents the compressed fluid from the passageway 37, thus by passing the air separation module 40. With the flow increased through the second compressor 36, the pressure increases within the passageways 37 and 39 and, in particular, at the inlet of the air separation module 40. Use of the vent passage 46 results in centrifugal second compressor 36 having an increased pressure ratio while using the same compressor rotor blade design of a proven configuration. Additionally, advantage may be taken of unused electric power that is already available.

An exit of the vent passage 46 may simply be an orifice plate or, for the example shown, an ejector nozzle 48. Utilizing the ejector 48 creates a low pressure area in the ram air outlet duct 21 such that air flow is increased through the heat exchanger system 12, which results in increased efficiency of the heat exchanger system 12.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An on-board inert gas generation system comprising:
   a first and second compressor in fluid communication with one another, the second compressor having an inlet and an outlet, the inlet in fluid communication with the first compressor;
   an air separation module with a passageway fluidly connecting the air separation module with the outlet; and
   vent passage arranged between the outlet and the air separation module venting fluid from there between, the vent passage increasing flow through the second compressor, wherein the vent passage is arranged between a heat exchanger and the outlet, the heat exchanger arranged between the vent passage and the air separation module.

2. The system according to claim 1, wherein an intercooler is arranged between the first and second compressors.

3. An on-board inert gas generation system comprising:
   a first and second compressor in fluid communication with one another, the second compressor having an inlet and an outlet, the inlet in fluid communication with the first compressor;
   an air separation module with a passageway fluidly connecting the air separation module with the outlet; and
   vent passage arranged between the outlet and the air separation module venting fluid from there between, the vent passage increasing flow through the second compressor, wherein the vent passage includes an ejector.

4. The system according to claim 3, wherein the ejector is arranged in a ram air duct.

5. The system according to claim 4, wherein the ejector is arranged on an outlet side of a heat exchanger, the ejector creating a low pressure area increasing flow through the heat exchanger.

6. The system according to claim 4, wherein a surge control passage fluidly connects an outlet of the first compressor and the ram air duct.

7. The system according to claim 6, wherein a surge control valve is arranged within the surge control passage, the surge control valve selectively opening in a low flow condition of the first compressor.

* * * * *